United States Patent
Morimoto et al.

(10) Patent No.: US 8,673,092 B2
(45) Date of Patent: Mar. 18, 2014

(54) OUTER MEMBER OF CONSTANT SPEED UNIVERSAL JOINT

(75) Inventors: Hiroo Morimoto, Iwata (JP); Kazuhiko Yoshida, Iwata (JP)

(73) Assignee: NTN Corporation, Osaka (JP)

( * ) Notice: Subject to any disclaimer, the term of this patent is extended or adjusted under 35 U.S.C. 154(b) by 315 days.

(21) Appl. No.: 13/144,105

(22) PCT Filed: Jan. 14, 2010

(86) PCT No.: PCT/JP2010/050319
§ 371 (c)(1),
(2), (4) Date: Jul. 12, 2011

(87) PCT Pub. No.: WO2010/082597
PCT Pub. Date: Jul. 22, 2010

(65) Prior Publication Data
US 2011/0269555 A1    Nov. 3, 2011

(30) Foreign Application Priority Data
Jan. 19, 2009   (JP) .................................. 2009-009004

(51) Int. Cl.
*F16D 3/00*   (2006.01)
*C22C 38/00*   (2006.01)

(52) U.S. Cl.
USPC .......................................... 148/320; 464/106

(58) Field of Classification Search
USPC .......................................... 148/320; 464/106
See application file for complete search history.

(56) References Cited

FOREIGN PATENT DOCUMENTS

| JP | 61-132284 | 6/1986 | |
|---|---|---|---|
| JP | 11323487 A | * 11/1999 | .............. C22C 38/00 |
| JP | 2006-002185 | 1/2006 | |
| JP | 2006-064060 | 3/2006 | |
| JP | 2007-270869 | 10/2007 | |
| JP | 2008-013811 | 1/2008 | |

OTHER PUBLICATIONS

Machine translation of JP 2006064060, 2006.*
Machine translation of JP 2007270869, 2007.*
International Preliminary Report on Patentability and Written Opinion of the International Searching Authority issued Aug. 25, 2011 in International (PCT) Application No. PCT/JP2010/050319.
International Search Report issued Feb. 9, 2010 in International (PCT) Application No. PCT/JP2010/050319.

* cited by examiner

*Primary Examiner* — Rebecca Lee
(74) *Attorney, Agent, or Firm* — Wenderoth, Lind & Ponack, L.L.P.

(57) ABSTRACT

An outer member of a constant velocity universal joint suppresses occurrences of cracking in a joining portion and has stable quality. The outer member includes a cup section having track grooves formed therein, and a shaft section having one end coupled to a bottom portion of the cup section. By joining members having different carbon contents and performing induction hardening on the members, a hardening heat-affected portion affected by the induction hardening, a hardening heat-unaffected portion unaffected by the induction hardening, a joining heat-affected portion affected by heat generated during the joining, and a joining heat-unaffected portion unaffected by the heat generated during the joining are formed. A martensitic structure is eliminated from the hardening heat-unaffected portion of the high carbon content member and is the joining heat-affected portion at an end portion including a joining end surface that is to be joined to the low carbon content member.

18 Claims, 1 Drawing Sheet

OUTER MEMBER OF CONSTANT SPEED UNIVERSAL JOINT

TECHNICAL FIELD

The present invention relates to an outer member of a constant velocity universal joint.

BACKGROUND ART

Constant velocity universal joints are incorporated into power transmission mechanisms of an automobile or industrial machinery of various types for use. The constant velocity universal joints include two shafts on a drive side and a driven side that are provided to have a variable crossing angle, and couple the two shafts so as to transmit rotation torque from the drive side to the driven side at constant velocity. The constant velocity universal joints are roughly classified into a fixed type constant velocity universal joint that allows only angular displacement and a plunging type constant velocity universal joint that allows angular displacement and axial displacement, and are chosen as appropriate depending on their uses.

For example, as the fixed type constant velocity universal joint, a Birfield joint (BJ) and an undercut-free joint (UJ) are known. The fixed type constant velocity universal joint of those types includes: an outer member (long stem type) including a cup section in which a plurality of guide grooves extending in an axial direction are formed in a spherical radially-inner surface, and including a shaft section having one end coupled to a bottom portion of the cup section and the other end provided with a spline; an inner member in which a plurality of guide grooves extending in the axial direction in pairs with the guide grooves of the outer member are formed in a spherical radially-outer surface; a plurality of torque transmitting balls disposed in ball tracks formed by cooperation of both the guide grooves of the outer member and the guide grooves of the inner member; and a cage disposed between the outer member and the inner member, for retaining the torque transmitting balls (Patent Literature 1 and Patent Literature 2).

As the plunging type constant velocity universal joint, a double offset joint (DOJ) and a tripod joint (TJ) are known. The plunging type constant velocity universal joint of the double offset type includes, as main components: an outer member (long stem type) including a cup section in which a plurality of track grooves extending in the axial direction are formed in a cylindrical inner peripheral surface, and including a shaft section having one end coupled to a bottom portion of the cup section and the other end provided with a spline; an inner member in which track grooves extending in the axial direction in pairs with the track grooves of the outer member are formed in a spherical outer peripheral surface; a plurality of balls interposed between the track grooves of the outer member and the track grooves of the inner member, for transmitting torque; and a cage interposed between the cylindrical inner peripheral surface of the outer member and the spherical outer peripheral surface of the inner member, for retaining the balls.

The outer member of the long stem type of the constant velocity universal joint described in Patent Literature 1 is subjected to heat treatment after a part forming the cup section and a part forming the shaft section are joined to each other. The spline (serration) is formed in the outer peripheral surface at one end in the axial direction of the part forming the shaft section, to thereby achieve a reduction in the number of parts, and a cost reduction attained by a reduction of joining portions. In addition, only the joining portion is increased in diameter, and hence strength of the joining portion is increased. Further, the strength can be increased by performing the heat treatment on substantially the entire region in the axial direction of the part forming the shaft section. Accordingly, it is possible to thin the shaft section, and to achieve a reduction in weight.

Further, Patent Literature 2 describes the joining shaft used as a drive shaft and the like. As a material of the joining shaft, steel basically containing carbon steel to which at least Cr of 0.2 to 0.8 wt % is added as an element improving hardenability is used, and the joining shaft joins the shafts to each other by friction welding. The friction welding is one kind of direct solid-state welding method of joining solids to each other without melting the solids, specifically, a joining method of rubbing members to be joined (for example, a metal, a resin, etc.) against each other at high speed and applying pressure simultaneously with softening the members by frictional heat generated by the rubbing. The friction welding method is advantageous in obtaining a product having high dimension accuracy with relatively easy work, and in performing assembly and joining of members subjected to finishing. In the joining portion subjected to the friction welding, a bainitic abnormal structure is generated. However, the joining portion is subjected to partial heating and hardening, to thereby be transformed into an austenitic structure. Then, the joining portion is quench-hardened to its center by cooling performed after the heating, and thus strength of the joining portion is increased to be higher in strength than other portions, with the result that the joining portion has reserve strength.

CITATION LIST

Patent Literature 1: JP 2006-64060 A
Patent Literature 2: JP 61-132284 A

SUMMARY OF INVENTION

Technical Problem

However, both the inventions described in Patent Literatures above relate to an increase in strength of the joining portion, and have not been made in view of stabilization of quality of the joining portion, that is, suppression of occurrence of cracking in the joining portion. Even when the strength of the joining portion is increased, if a defect such as cracking occurs in the joining portion, the quality may become unstable.

In view of the above-mentioned problem, the present invention provides an outer member of a constant velocity universal joint, which suppresses occurrence of cracking in a joining portion of the constant velocity universal joint and has stable quality.

Solution to Problem

According to the present invention, provided is an outer member of a constant velocity universal joint, including: a cup section having a plurality of track grooves formed therein; and a shaft section having one end coupled to a bottom portion of the cup section, in which, by joining members having different carbon contents to each other and then performing induction hardening on the members, a hardening heat-affected portion affected by the induction hardening, a hardening heat-unaffected portion unaffected by the induction hardening, a joining heat-affected portion affected by heat generated at a time of the joining, and a joining heat-unaffected portion unaffected by the heat generated at the time of the joining are formed, and in which a martensitic structure is eliminated from a portion that is the hardening heat-unaffected portion of one of the members having a high carbon content and is the joining heat-affected portion at an end portion including a joining end surface that is to be joined to another one of the members having a low carbon content.

In the outer member of the constant velocity universal joint according to the present invention, the martensitic structure is eliminated from the portion that is the hardening heat-unaffected portion of the member having the high carbon content and is the joining heat-affected portion at the end portion including the joining end surface that is to be joined to the member having the low carbon content. Thus, tensile stress due to structure transformation does not occur at this portion.

The member having the high carbon content may have a degree of segregation of carbon of 1.02 to 1.12. Here, assuming that D represents a diameter of a billet, C0 represents a carbon content of a 1/4D portion, and C represents a carbon content of a segregation portion present in the vicinity of the center of the billet, the degree of segregation is represented as C/C0. When the degree of segregation is less than 1.02, component segregation that is inevitable in general steel making is not allowed, and hence a huge amount of cost is required for the steel making. Meanwhile, when the degree of segregation exceeds 1.12, there is increased a risk in that the martensitic structure is generated due to a heat effect at the time of joining along with an increase in carbon content.

The member having the high carbon content may have a carbon content of 0.45 to 0.58 mass %. Regarding the member having the high carbon content, in particular, the cup section is required to have a rolling fatigue life in the cup section. Accordingly, when the carbon content is less than 0.45 mass %, in order to secure the required life, hardness and a ratio of a hardened layer need to be considerably increased, which may cause significant occurrence of hardening cracking. Further, when the carbon content exceeds 0.58 mass %, grain boundary strength is reduced, and in addition, machinability, cold forgeability, and hardening-cracking resistance may be reduced.

The member having the low carbon content may have a carbon content of 0.35 to 0.46 mass %, more preferably 0.38 to 0.45 mass %. Regarding the member having the low carbon content, in particular, a spline portion at a shaft end portion is required to have torsional strength and torsional fatigue strength. Accordingly, when the content is less than 0.35 mass %, in order to secure the required strength, the ratio of the hardened layer needs to be considerably increased, which may cause significant occurrence of hardening cracking. Further, when the carbon content exceeds 0.46 mass %, the grain boundary strength is reduced, and in addition, machinability, suitability for rolling, and hardening-cracking resistance may be reduced.

In comparison to hardness of a base material, hardness of the joining heat-affected portion may be increased to HV 50 to 150 along with the joining of the member having the high carbon content and the member having the low carbon content. With respect to the hardness of the base material, an increase in hardness of the heat-affected layer along with the joining is suppressed to HV 50 to 150. Thus, it is possible to avoid a reduction in strength due to a sharp change in hardness. Note that, the hardness is increased to HV 50 or more because the hardness is inevitably increased by the heat effect due to the joining. The hardness is increased to HV 150 or less in order to prevent the sharp change in hardness.

Sulfur contents of the member having the high carbon content and the member having the low carbon content may be set to 0.005 to 0.020 mass %. Sulfur forms MnS in steel, and is a useful element that improves machinability. When the sulfur content is less than 0.005 mass %, machinability is degraded. When the sulfur content exceeds 0.020 mass %, joining property is deteriorated, that is, for example, cracking occurs at the time of joining.

Boron of 0.0005 mass % to 0.0035 mass % may be added to at least one of the member having the high carbon content and the member having the low carbon content. Boron is effective in improving hardenability by the addition of a minor amount thereof, and in increasing a hardening depth to increase strength. In addition, boron segregates preferentially in a grain boundary to reduce a concentration of phosphorus segregating in the grain boundary, to thereby increase the grain boundary strength. Further, boron also increases the hardening-cracking resistance by strengthening the grain boundary. When the boron content is less than 0.0005 mass %, the above-mentioned effect is poor. When the boron content exceeds 0.0035 mass %, the effect is saturated. If anything, an increase in component cost is caused.

The shaft section may include a spline formed at an end portion thereof opposite to the cup section side, and a diameter of a joining portion constituted by the joined members having the different carbon contents may be set to be larger than an outer diameter of the spline.

Scan hardening may be used as an induction hardening method for the shaft section. The scan hardening refers to a method of heating an object to be heated while relatively moving the object to be heated and an induction heating coil.

When a ratio D/d between a diameter $\phi D$ of the joining portion and a small diameter $\phi d$ of the spline formed in the shaft section exceeds 1.4, stationary hardening may be used as an induction hardening method for the shaft section. The stationary hardening refers to a method of, when heating the object to be heated to a hardening temperature, heating the object to be heated using an induction heating coil having a shape along the object to be heated, while placing the induction heating coil and the object to be heated at predetermined positions, in other words, without moving the induction heating coil and the object to be heated.

A radially-outer portion of the joining portion may be subjected to ground finishing after being quench-hardened. Further, a radially-outer portion of the joining heat-affected portion including the joining portion may be subjected to a shot peening process. In addition, of the quench-hardened shaft section, at least a spline portion formed at a shaft end portion may be subjected to the shot peening process.

A shaft member may be formed of a solid raw material, or may be formed of a hollow raw material. In a case of being formed of the hollow raw material, the hollow raw material may include an electro-resistance-welded tube or a seamless pipe.

The outer member may be used for a plunging type constant velocity universal joint of a tripod type, or a fixed type constant velocity universal joint of a ball type.

Advantageous Effects of Invention

In the outer member of the constant velocity universal joint according to the present invention, the martensitic structure is eliminated from the portion that is the hardening heat-unaffected portion of the member having the high carbon content and is the joining heat-affected portion at the end portion including the joining end surface that is to be joined to the member having the low carbon content. Thus, tensile stress due to structure transformation does not occur at this portion. As a result, it is possible to suppress occurrence of cracking in the vicinity of the joining portion, and to attain stable quality.

Therefore, the outer member of the constant velocity universal joint can exert a stable function over a long period of time.

When the degree of segregation of carbon of the member having the high carbon content is set to 1.02 to 1.12, the martensitic structure can be effectively eliminated from an inside of a layer that is heat-affected at the time of joining to another member and includes the joining end surface, and thus cracking of the joining portion can be suppressed stably.

When the carbon content of the member having the high carbon content is set to 0.45 to 0.58%, it is possible to prevent a reduction in grain boundary strength, and a degradation in machinability, cold forgeability, and hardening-cracking resistance while preventing occurrence of hardening cracking, and to increase a rolling fatigue life particularly in the cup section.

When the carbon content of the member having the low carbon content is set to 0.35 to 0.46%, it is possible to prevent a reduction in grain boundary strength, and a degradation in machinability, suitability for rolling, and hardening-cracking resistance while preventing occurrence of hardening cracking, and to increase torsional strength and torsional fatigue strength particularly of the spline portion of the shaft end portion.

In comparison to the hardness of the base material, the hardness of the joining heat-affected portion is increased to HV 50 to 150 along with the joining of the member having the high carbon content and the member having the low carbon content. Thus, it is possible to avoid a reduction in strength due to a sharp change in hardness, and to reduce a risk in that cracking occurs in the vicinity of the joining portion.

When the sulfur contents of the member having the high carbon content and the member having the low carbon content are set to 0.005 to 0.020 mass %, it is possible to suppress occurrence of cracking in the vicinity of the joining portion while improving machinability, and to improve workability.

When boron of 0.0005 to 0.0035 mass % is added to at least one of the members having the different carbon contents, it is possible to further increase strength.

When the diameter of the joining portion is set to be larger than the outer diameter of the spline formed in the shaft section, joining strength between the members having the different carbon contents is increased.

When the scan hardening is used as the induction hardening method for the shaft section, in a case where an axially-long object such as a long stem is hardened in induction hardening, a coil used for hardening can be shared as long as objects to be hardened have the same shaft diameter, even if they have different axial lengths, which is efficient. Further, it is possible to achieve a reduction in manufacturing cost.

When the ratio D/d between the diameter $\phi D$ of the joining portion and the small diameter $\phi d$ of the spline formed in the shaft section exceeds 1.4, it is effective to use stationary hardening as the induction hardening method for the shaft section. In other words, when the difference between the diameter $\phi D$ of the joining portion as a maximum diameter in the hardening range, and the small diameter $\phi d$ of the spline as a minimum diameter is large, in a case of performing hardening using one hardening coil, there is a large difference in clearances between the hardening coil and a workpiece at the respective portions, and hence overheating and underheating occur. Therefore, when the ratio $\phi D/\phi d$ exceeds 1.4, in a case of performing stationary hardening using a dedicated coil, overheating and underheating can be prevented from occurring.

When the radially-outer portion of the joining portion is subjected to ground finishing after being quench-hardened, it is possible to eliminate a dimensional change and deformation that are affected by processing and heat treatment strain. Consequently, high accuracy is attained.

When the shot peening process is performed on the radially-outer portion of the joining heat-affected portion including the joining portion, and on at least the spline portion of the quench-hardened shaft section, which is formed at the shaft end portion, compressive residual stress is generated in a surface layer and work hardening occurs. Thus, it is possible to increase static strength and fatigue strength.

When the shaft member is formed of a solid raw material, relatively less limitation is imposed on facilities and the like in manufacture of the raw material, which is advantageous for availability.

When the shaft member is formed of a hollow raw material, rigidity can be increased by increasing the outer diameter of the shaft section, and a significant reduction in weight can be achieved. In this case, when an electro-resistance-welded tube is used as the hollow raw material of the shaft member, the electro-resistance-welded tube has a good dimension accuracy and is relatively inexpensive because it is formed of a plate material, but the electro-resistance-welded tube has a seam portion produced by welding at the time of manufacture of a raw pipe. Further, when a seamless pipe is used as the hollow raw material of the shaft member, a hole is pierced in the raw material and the hole is expanded. Accordingly, there is no seam portion, but it is difficult to make the thickness uniform.

The outer member according to the present invention may be used for a plunging type constant velocity universal joint of a tripod type and a fixed type constant velocity universal joint of a ball type. In other words, the outer member according to the present invention is applicable to constant velocity universal joints of various types.

| Reference Signs List | |
|---|---|
| 1 | cup section |
| 2 | shaft section |
| 11 | joining portion |
| 21 | cup-section-side forming part |
| 22 | shaft-section-side forming part |
| 23, 24 | joining end surface |
| 25, 26 | end portion |

DETAILED DESCRIPTION OF THE INVENTION

An outer member of a constant velocity universal joint according to embodiments of the present invention are described with reference to FIG. 1 and FIG. 2.

A tripod type constant velocity universal joint includes the outer member, a tripod member as an inner member, and rollers as torque transmitting members.

Figure 1:
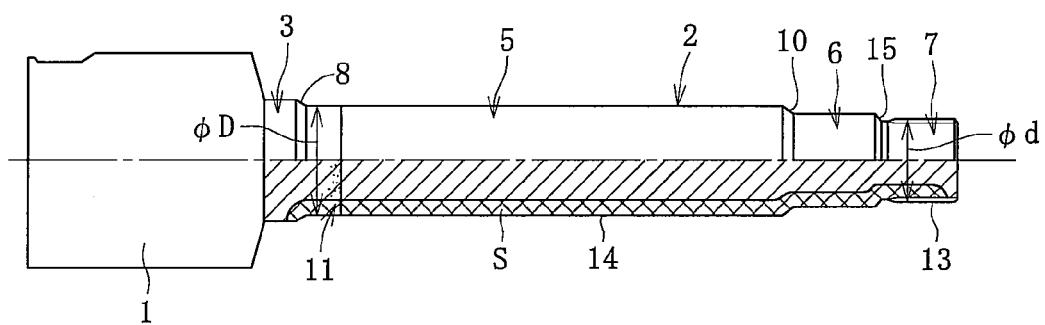
[FIG. 1] A partial sectional view of an outer member of a constant velocity universal joint according to a first embodiment of the present invention.
Figure 2:
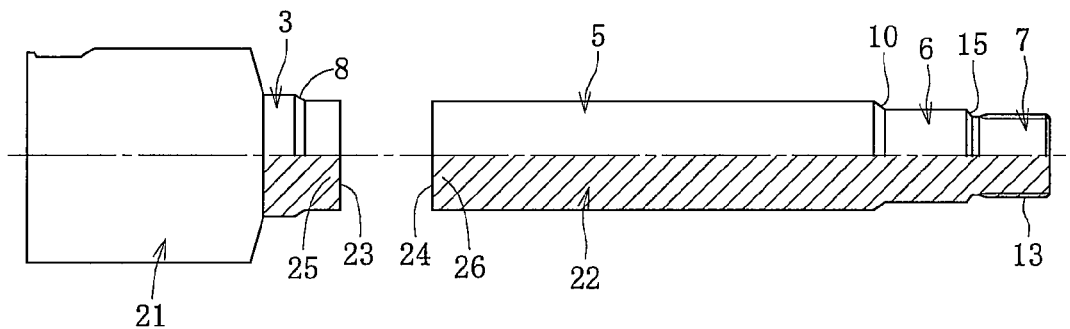
[FIG. 2] A partial sectional view of the outer member before a cup-section-side forming part and a shaft-section-side forming part are friction welded to each other.

FIG. 1 is a partial sectional view of the outer member of the tripod type constant velocity universal joint according to a first embodiment. As illustrated in FIG. 1, the outer member includes a cup section 1 and a shaft section 2 extending integrally with the cup section 1 in an axial direction.

The cup section 1 has an opening at one end, and has an inner diameter with a cylindrical shape. At equiangularly spaced positions of an inner surface of the cup section 1, track grooves (not shown) extending in the axial direction are formed.

The shaft section 2 is a solid columnar member over its entire length in the axial direction. The shaft section 2 includes a plurality of columnar portions 3, 5, 6, and 7 having different outer diameter dimensions, and tapered surfaces 8, 10, and 15 each interposed between the columnar portions. In the columnar portion 5, there is formed a joining portion 11 at which end portions 25 and 26 (see FIG. 2) of two members (cup-section-side forming part 21 and shaft-section-side forming part 22) are joined to each other. In a radially-outer surface of the columnar portion 7, a coupling portion (spline) 13 for coupling the constant velocity universal joint is formed. An outer diameter φD of the columnar portion including the joining portion 11 is larger than an outer diameter φd of the columnar portion 7 including the spline 13. All over the radially-outer surface of the shaft section 3 of the outer member, a hardened layer S is formed.

Next, description is made of a method of manufacturing an outer member of a plunging type constant velocity universal joint of a tripod type. First, two members having different carbon contents are prepared. In this case, as illustrated in FIG. 2, the two members are the cup-section-side forming part 21 mainly forming the cup section 1, and the shaft-section-side forming part 22 mainly forming the shaft section 2.

Regarding the cup-section-side forming part 21, a martensitic structure is eliminated from a portion that is a hardening heat-unaffected portion (portion unaffected by heat due to induction hardening) other than a heat-affected portion affected by induction hardening described below and is a joining heat-affected portion (portion affected by heat generated at the time of joining) at the end portion 25 including a joining end surface 23 that is to be joined to the shaft-section-side forming part 22.

As the cup-section-side forming part 21, a steel product having a carbon content of 0.45 mass % to 0.58 mass % is used. Meanwhile, as the shaft-section-side forming part 22, a steel product having a carbon content of 0.35 mass % to 0.46 mass %, more preferably 0.38 to 0.45 mass % is used. In other words, the cup-section-side forming part 21 is a member having a high carbon content, whereas the shaft-section-side forming part 22 is a member having a low carbon content. Regarding the cup-section-side forming part 21, the cup section 1 is required to have a rolling fatigue life in the cup section. Accordingly, when the carbon content is less than 0.45 mass %, in order to secure the required life, hardness and a ratio of the hardened layer need to be considerably increased, which may cause significant occurrence of hardening cracking. Further, when the carbon content exceeds 0.58 mass %, grain boundary strength is reduced, and in addition, machinability, cold forgeability, and hardening-cracking resistance may be reduced. Meanwhile, regarding the shaft-section-side forming part 22, in particular, the spline 13 at a shaft end portion is required to have torsional strength and torsional fatigue strength. Accordingly, when the content is less than 0.35 mass %, in order to secure the required strength, the ratio of the hardened layer needs to be considerably increased, which may cause significant occurrence of hardening cracking. Further, when the carbon content exceeds 0.46 mass %, the grain boundary strength is reduced, and in addition, machinability, suitability for rolling, and hardening-cracking resistance may be reduced.

A degree of segregation of carbon of the cup-section-side forming part 21 is set to 1.02 to 1.12. Through such regulation of the carbon content, the martensitic structure can be eliminated from the portion that is the hardening heat-unaffected portion of the cup-section-side forming part 21 and is the joining heat-affected portion at the end portion 25 including the joining end surface 23 that is to be joined to the shaft-section-side forming part 22. Here, assuming that D represents a diameter of a billet, C0 represents a carbon content of a 1/4D portion, and C represents a carbon content of a segregation portion present in the vicinity of the center of the billet, the degree of segregation is represented as C/C0. When the degree of segregation is less than 1.02, component segregation that is inevitable in general steel making is not allowed, and hence a huge amount of cost is required for the steel making. Meanwhile, when the degree of segregation exceeds 1.12, there is increased a risk in that the martensitic structure is generated due to a heat effect at the time of joining along with an increase in carbon content.

Sulfur contents of the cup-section-side forming part 21 and the shaft-section-side forming part 22 are set to 0.005 to 0.020 mass %. Sulfur forms MnS in steel, and is a useful element that improves machinability. When the sulfur content is less than 0.005 mass %, machinability is degraded. When the sulfur content exceeds 0.020 mass %, joining property is deteriorated, that is, for example, cracking occurs at the time of joining.

Boron contents of the cup-section-side forming part 21 and the shaft-section-side forming part 22 are set to 0.0005 mass % to 0.0035 mass %. Boron is effective in improving hardenability by the addition of a minor amount thereof, and in increasing a hardening depth to increase strength. In addition, boron segregates preferentially in a grain boundary to reduce a concentration of phosphorus segregating in the grain boundary, to thereby increase the grain boundary strength. Further, boron also increases the hardening-cracking resistance by strengthening the grain boundary. When the boron content is less than 0.0005 mass %, the above-mentioned effect is poor. When the boron content exceeds 0.0035 mass %, the effect is saturated. If anything, an increase in component cost is caused.

The end portion 25 of the cup-section-side forming part 21 and the end portion 26 of the shaft-section-side forming part 22 are then friction welded so as to be joined to each other. In other words, the end surface 23 of the cup-section-side forming part 21 and an end surface 24 of the shaft-section-side forming part 22 are joined to each other by a method of rubbing the end surfaces against each other at high speed and applying pressure simultaneously with softening the members by frictional heat generated by the rubbing. With this method, as illustrated in FIG. 1, the outer member including the cup section 1 and the shaft section 2 is formed.

In this case, in comparison to hardness of a base material, hardness of the joining heat-affected portion is increased to HV 50 to 150 along with the joining. Thus, it is possible to avoid a reduction in strength due to a sharp change in hardness. Note that, the hardness is increased to HV 50 or more because the hardness is inevitably increased by the heat effect due to the joining. The hardness is increased to HV 150 or less in order to prevent the sharp change in hardness.

Next, an outer peripheral surface of the shaft section 2 is subjected to an induction hardening method using scan hardening. The scan hardening refers to a method of heating an object to be heated while relatively moving the object to be heated and an induction heating coil. With this method, the hardened layer S is formed all over the radially-outer surface of the shaft section 2.

After being quench-hardened, a radially-outer portion of the joining portion 11 is subjected to ground finishing. Further, the radially-outer portion within a range that is heat-affected at the time of joining and includes the joining portion 11 is subjected to a shot peening process, and, of the quench-hardened shaft section 2, the spline 13 formed at the shaft end portion is subjected to the shot peening process.

As described above, in the outer member of the constant velocity universal joint according to the first embodiment, the martensitic structure is eliminated from the portion that is the hardening heat-unaffected portion of the cup-section-side forming part 21 and is the joining heat-affected portion at the end portion 25 including the joining end surface 23 that is to be joined to the shaft-section-side forming part 22. Thus, tensile stress due to structure transformation does not occur at this portion. As a result, it is possible to suppress occurrence of cracking in the joining portion 11, and to attain stable quality. Therefore, the outer member of the constant velocity universal joint can exert a stable function over a long period of time.

When the degree of segregation of carbon of the cup-section-side forming part 21 is set to 1.02 to 1.12, the martensitic structure can be effectively eliminated from an inside of a layer that is heat-affected at the time of joining to the shaft-section-side forming part 22 and includes the joining end surface 23, and thus cracking of the joining portion 11 can be suppressed stably.

When the carbon content of the cup-section-side forming part 21 is set to 0.45 to 0.58%, it is possible to prevent a reduction in grain boundary strength, and a degradation in machinability, cold forgeability, and hardening-cracking resistance while preventing occurrence of hardening cracking, and to increase a rolling fatigue life in the cup section.

When the carbon content of the shaft-section-side forming part 22 is set to 0.35 to 0.46%, it is possible to prevent a reduction in grain boundary strength, and a degradation in machinability, suitability for rolling, and hardening-cracking resistance while preventing occurrence of hardening cracking, and to increase torsional strength and torsional fatigue strength of the spline 13 of the shaft end portion.

In comparison to the hardness of the base material, the hardness of the joining heat-affected portion is increased to HV 50 to 150 along with the joining of the cup-section-side forming part 21 and the shaft-section-side forming part 22. Thus, it is possible to avoid a reduction in strength due to a sharp change in hardness, and to reduce a risk in that cracking occurs in the vicinity of the joining portion.

When the sulfur contents of the cup-section-side forming part 21 and the shaft-section-side forming part 22 are set to 0.005 to 0.020 mass %, it is possible to suppress occurrence of cracking in the vicinity of the joining portion while improving machinability, and to improve workability.

When boron of 0.0005 to 0.0035 mass % is added to the cup-section-side forming part 21 and the shaft-section-side forming part 22, it is possible to further increase strength.

When the diameter of the joining portion 11 is set to be larger than the outer diameter of the spline 13 formed in the shaft section, joining strength between the cup-section-side forming part 21 and the shaft-section-side forming part 22 is increased.

When the scan hardening is used as the induction hardening method for the shaft section 2, in a case where an axially-long object such as a long stem is hardened in induction hardening, a coil used for hardening can be shared as long as objects to be hardened have the same shaft diameter, even if they have different axial lengths, which is efficient. Further, it is possible to achieve a reduction in manufacturing cost.

When the radially-outer surface of the joining portion 11 is subjected to ground finishing after being quench-hardened, it is possible to eliminate a dimensional change and deformation that are affected by processing and heat treatment strain. Consequently, high accuracy is attained.

When the shot peening process is performed on the radially-outer portion within the range that is heat-affected at the time of joining and includes the joining portion 11, and on at least the spline 13 of the quench-hardened shaft section, which is formed at the shaft end portion, compressive residual stress is generated in a surface layer and work hardening occurs. Thus, it is possible to increase static strength and fatigue strength.

When a shaft member is formed of a solid raw material, relatively less limitation is imposed on facilities and the like in manufacture of the raw material, which is advantageous for availability.

As another embodiment, the shaft member is formed of a hollow raw material. With this, rigidity can be increased by increasing the outer diameter of the shaft section 2, and a significant reduction in weight can be achieved. In this case, when an electro-resistance-welded tube is used as the hollow raw material of the shaft member, the electro-resistance-welded tube has a good dimension accuracy and is relatively inexpensive because it is formed of a plate material, but the electro-resistance-welded tube has a seam portion produced by welding at the time of manufacture of a raw pipe. Further, when a seamless pipe is used as the hollow raw material of the shaft member, a hole is pierced in the raw material and the hole is expanded. Accordingly, there is no seam portion, but it is difficult to make the thickness uniform.

Moreover, as still another embodiment, when a ratio D/d between the diameter $\phi D$ of the joining portion 11 and the small diameter $\phi d$ of the spline 13 formed at the end portion exceeds 1.4, it is effective to use stationary hardening as the induction hardening method for the shaft section 2. In other words, when the difference between the diameter $\phi D$ of the joining portion 11 as a maximum diameter in the hardening range, and the small diameter $\phi d$ of the spline as a minimum diameter is large, in a case of performing hardening using one hardening coil, there is a large difference in clearances between the hardening coil and a workpiece at the respective portions, and hence overheating and underheating occur. Therefore, when the ratio $\phi D/\phi d$ exceeds 1.4, in a case of performing stationary hardening using a dedicated coil, overheating and underheating can be prevented from occurring.

In the above-mentioned embodiments, the outer member according to the present invention is used for the plunging type joint of a tripod type, but may be used for a fixed type joint of a ball type. In other words, the outer member according to the present invention is applicable to constant velocity universal joints of various types.

In the above description, the embodiments of the present invention are described, but the present invention is not limited to the above-mentioned embodiments and various modifications are possible. For example, sulfur and boron may be added to only any one of the cup-section-side forming part 21 and the shaft-section-side forming part 22. In the above-mentioned embodiments, the cup-section-side forming part 21 has a high carbon content, whereas the shaft-section-side forming part 22 has a low carbon content. However, the cup-section-side forming part 21 may have a low carbon content, whereas the shaft-section-side forming part 22 may have a high carbon content.

EXAMPLE

A cup-section-side forming part was formed of a carbon steel for machine construction (JIS G4051) having a carbon content of 0.53%, and a shaft-section-side forming part was formed of a carbon steel for machine construction (JIS G4051) having a carbon content of 0.45%. Then, the cup-section-side forming part and the shaft-section-side forming part were friction welded so as to be joined to each other, to thereby form an outer member of a constant velocity universal joint. Table 1 shows the test results of the outer member of the constant velocity universal joint regarding the following: presence or absence of a martensitic structure; a degree of segregation; a sulfur content; an amount of hardness increase with respect to hardness of a base material in a layer that is heat-affected by joining; and whether or not cracking occurs due to joining.

TABLE 1

|  | Cracking | Martensite | Degree of segregation | sulfur content (%) | Hardness with respect to base material |
|---|---|---|---|---|---|
| No. 1 | None | None | 1.07 | 0.012 | 105 |
| No. 2 | Present | Present | 1.18 | 0.012 | 220 |
| No. 3 | Present | None | 1.18 | 0.012 | 205 |
| No. 4 | Present | None | 1.07 | 0.033 | 115 |
| No. 5 | Present | None | 1.18 | 0.005 | 200 |
| No. 6 | None | None | 1.04 | 0.015 | 65 |
| No. 7 | None | None | 1.11 | 0.007 | 95 |

In Table 1, cracking occurred in No. 2 to No. 5. In No. 2, the occurrence of cracking is supposed to be caused because the martensitic structure is present, the degree of segregation is 1.18, that is, out of the range of 1.02 to 1.12, and the hardness with respect to the base material is HV 220, that is, out of the range of HV 50 to HV 150. In No. 3, the occurrence of cracking is supposed to be caused because the degree of segregation is 1.18, that is, out of the range of 1.02 to 1.12, and the hardness with respect to the base material is HV 205, that is, out of the range of HV 50 to HV 150. In No. 4, the occurrence of cracking is supposed to be caused because the sulfur content is 0.033 mass %, that is, out of the range of 0.005 mass % to 0.020 mass %. In No. 5, the occurrence of cracking is supposed to be caused because the degree of segregation is 1.18, that is, out of the range of 1.02 to 1.12, and the hardness with respect to the base material is HV 200, that is, out of the range of HV 50 to HV 150.

Meanwhile, in No. 1, No. 6, and No. 7, no cracking occurred. Those results are supposed to be obtained because the martensitic structure is not present, the degree of segregation is 1.07, 1.04, or 1.11, that is, within the range of 1.02 to 1.12, the sulfur content is 0.012 mass %, 0.015 mass %, or 0.007 mass %, that is, within the range of 0.005 mass % to 0.020 mass %, and the hardness with respect to the base material is HV 105, HV 65, or HV 95, that is, within the range of HV 50 to HV 150.

Industrial Applicability

The present invention can be used for the outer member of the constant velocity universal joint, the outer member including: the cup section having the plurality of track grooves formed therein; and the shaft section having one end coupled to a bottom portion of the cup section.

The invention claimed is:

1. An outer member of a constant velocity universal joint, the outer member comprising:
    a cup-section-side forming part including a cup section having a plurality of track grooves formed therein; and
    a shaft-section-side forming part including a shaft section having one end coupled to a bottom portion of the cup section, wherein
    the cup-section-side forming part and the shaft-section-side forming part are friction welded together,
    the cup-section-side forming part and the shaft-section-side forming part have different carbon content,
    one of the cup-section-side forming part and the shaft-section-side forming part having a high carbon content has a carbon content of 0.45 mass % to 0.58 mass %, and another of the cup-section-side forming part and the shaft-section-side forming part having a low carbon content has a carbon content of 0.35 mass % to 0.46 mass %,
    the friction welded cup-section-side forming part and shaft-section-side forming part include an induction hardened layer, a hardening heat-affected portion affected by induction hardening, a hardening heat-unaffected portion unaffected by the induction hardening, a joining heat-affected portion affected by heat generated at a time of friction welding, and a joining heat-unaffected portion unaffected by the heat generated at the time of the friction welding, and
    the one of the cup-section-side forming part and the shaft-section-side forming part having the high carbon content has an end portion with a joining end surface that is joined to the other of the cup-section-side forming part and the shaft-section-side forming part having the low carbon content, the hardening heat-unaffected portion at the end portion being free from a martensitic structure and the joining heat-affected portion being at the end portion.

2. An outer member of a constant velocity universal joint according to claim 1, wherein the one of the cup-section-side forming part and the shaft-section-side forming part having the high carbon content has a degree of segregation of carbon of 1.02 to 1.12.

3. An outer member of a constant velocity universal joint according to claim 1, wherein, in comparison to hardness of a base material, hardness of the joining heat-affected portion is increased to HV 50 to 150 by the heat generated at the time of the friction welding.

4. An outer member of a constant velocity universal joint according to claim 1, wherein the one of the cup-section-side forming part and the shaft-section-side forming part having the high carbon content has a sulfur content of 0.005 to 0.020 mass %.

5. An outer member of a constant velocity universal joint according to claim 1, wherein the other of the cup-section-side forming part and the shaft-section-side forming part having the low carbon content has a sulfur content of 0.005 to 0.020 mass %.

6. An outer member of a constant velocity universal joint according to claim 1, wherein at least one of the cup-section-side forming part and the shaft-section-side forming part includes boron of 0.0005 mass % to 0.0035 mass %.

7. An outer member of a constant velocity universal joint according to claim 1, wherein
    the shaft section includes a spline formed at an end portion thereof opposite to a cup section side, and a diameter of a joining portion where the cup-section-side forming part and the shaft-section-side forming part are friction welded together is larger than an outer diameter of the spline.

8. An outer member of a constant velocity universal joint according to claim 1, wherein the shaft section includes the hardening heat-affected portion affected by scan hardening.

9. An outer member of a constant velocity universal joint according to claim 1, wherein
the shaft section includes a spline formed at an end portion thereof opposite to a cup section side, and
when a ratio between a diameter $\phi D$ of a joining portion where the cup-section-side forming part and the shaft-section-side forming part are friction welded together and a small diameter $\phi d$ of the spline of the shaft section exceeds 1.4, the shaft section includes the hardening heat-affected portion affected by stationing hardening.

10. An outer member of a constant velocity universal joint according to claim 1, wherein a radially-outer portion of a joining portion where the cup-section-side forming part and the shaft-section-side forming part are friction welded together is quench-hardened and ground finished.

11. An outer member of a constant velocity universal joint according to claim 1, wherein a radially-outer portion of a joining heat-affected portion including a joining portion where the cup-section-side forming part and the shaft-section-side forming part are friction welded together is shot peened.

12. An outer member of a constant velocity universal joint according to claim 1, wherein
the shaft section is quench-hardened and has a shaft end portion,
at least the shaft end portion of the shaft section has a spline formed therein, and the spline is shot peened.

13. An outer member of a constant velocity universal joint according to claim 1, wherein the shaft section is formed of a solid raw material.

14. An outer member of a constant velocity universal joint according to claim 1, wherein the shaft section is formed of a hollow raw material.

15. An outer member of a constant velocity universal joint according to claim 1, wherein the shaft section is formed of a hollow raw material, and the hollow raw material of the shaft section comprises an electro-resistance-welded tube.

16. An outer member of a constant velocity universal joint according to claim 1, wherein the shaft section is formed of a hollow raw material, and the hollow raw material of the shaft section comprises a seamless pipe.

17. A plunging type constant velocity universal joint of a tripod type comprising a constant velocity universal joint according to claim 1.

18. A fixed type constant velocity universal joint of a ball type comprising an outer member of a constant velocity universal joint according to claim 1.

* * * * *